US011552871B2

(12) United States Patent
Sela et al.

(10) Patent No.: US 11,552,871 B2
(45) Date of Patent: Jan. 10, 2023

(54) RECEIVE-SIDE TIMESTAMP ACCURACY

(71) Applicant: Mellanox Technologies, Ltd., Yokneam (IL)

(72) Inventors: Ran Sela, Givat Shmuel (IL); Liron Mula, Ramat Gan (IL); Ran Ravid, Tel Aviv (IL); Guy Lederman, Rishon Lezion (IL); Dotan David Levi, Kiryat Motzkin (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 180 days.

(21) Appl. No.: 16/900,931

(22) Filed: Jun. 14, 2020

(65) Prior Publication Data
US 2021/0392065 A1    Dec. 16, 2021

(51) Int. Cl.
*H04L 43/106* (2022.01)
*H04J 3/06* (2006.01)
*H04L 43/0852* (2022.01)
*G06F 15/173* (2006.01)
*H04L 7/00* (2006.01)

(52) U.S. Cl.
CPC .......... *H04L 43/106* (2013.01); *H04J 3/0667* (2013.01); *H04J 3/0697* (2013.01); *H04L 43/0852* (2013.01); *G06F 15/17325* (2013.01); *H04L 7/0012* (2013.01); *H04L 7/0033* (2013.01); *H04L 2463/121* (2013.01)

(58) Field of Classification Search
CPC ............. H04L 7/0033; H04L 7/0012; H04L 2463/121; H04L 43/106; H04L 43/43; H04L 43/0852; G06F 15/17325; H04J 3/0667; H04J 3/0697

USPC .......... 713/401, 502, 503; 709/248
See application file for complete search history.

(56) References Cited

U.S. PATENT DOCUMENTS 5,392,421 A   2/1995   Lennartsson
5,402,394 A   3/1995   Turski
5,416,808 A   5/1995   Witsaman et al.
(Continued)

FOREIGN PATENT DOCUMENTS

CN    106817183 A    6/2017
CN    108829493 A    11/2018
(Continued)

OTHER PUBLICATIONS

IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
(Continued)

*Primary Examiner* — Ji H Bae
(74) *Attorney, Agent, or Firm* — Kligler & Associates Patent Attorneys Ltd

(57) ABSTRACT

In one embodiment, a network device, includes a network interface port configured to receive data symbols from a network node over a packet data network, at least some of the symbols being included in data packets, and controller circuitry including physical layer (PHY) circuitry, which includes receive PHY pipeline circuitry configured to process the received data symbols, and a counter configured to maintain a counter value indicative of a number of the data symbols in the receive PHY pipeline circuitry.

21 Claims, 7 Drawing Sheets

(56) References Cited

U.S. PATENT DOCUMENTS

| | | | |
|---|---|---|---|
| 5,491,792 A | 2/1996 | Grisham et al. | |
| 5,564,285 A | 10/1996 | Jurewicz et al. | |
| 5,592,486 A * | 1/1997 | Lo | H04L 43/00 370/389 |
| 5,896,524 A | 4/1999 | Halstead, Jr. et al. | |
| 6,055,246 A | 4/2000 | Jones | |
| 6,084,856 A * | 7/2000 | Simmons | H04L 49/351 370/235 |
| 6,144,714 A | 11/2000 | Bleiweiss et al. | |
| 6,199,169 B1 | 3/2001 | Voth | |
| 6,289,023 B1 | 9/2001 | Dowling et al. | |
| 6,449,291 B1 | 9/2002 | Burns et al. | |
| 6,535,926 B1 | 3/2003 | Esker | |
| 6,556,638 B1 | 4/2003 | Blackburn | |
| 6,718,476 B1 | 4/2004 | Shima | |
| 6,918,049 B2 | 7/2005 | Lamb et al. | |
| 7,111,184 B2 | 9/2006 | Thomas, Jr. et al. | |
| 7,191,354 B2 | 3/2007 | Purho | |
| 7,245,627 B2 | 7/2007 | Goldenberg et al. | |
| 7,254,646 B2 | 8/2007 | Aguilera et al. | |
| 7,334,124 B2 | 2/2008 | Pham et al. | |
| 7,412,475 B1 | 8/2008 | Govindarajalu | |
| 7,440,474 B1 | 10/2008 | Goldman et al. | |
| 7,447,975 B2 | 11/2008 | Riley | |
| 7,483,448 B2 | 1/2009 | Bhandari et al. | |
| 7,496,686 B2 | 2/2009 | Coyle | |
| 7,535,933 B2 | 5/2009 | Zerbe et al. | |
| 7,623,552 B2 | 11/2009 | Jordan et al. | |
| 7,636,767 B2 | 12/2009 | Lev-Ran et al. | |
| 7,650,158 B2 | 1/2010 | Indirabhai | |
| 7,656,751 B2 | 2/2010 | Rischar et al. | |
| 7,750,685 B1 | 7/2010 | Bunch et al. | |
| 7,904,713 B1 | 3/2011 | Zajkowski et al. | |
| 7,941,684 B2 | 5/2011 | Serebrin et al. | |
| 8,065,052 B2 | 11/2011 | Fredriksson et al. | |
| 8,341,454 B1 | 12/2012 | Kondapalli | |
| 8,370,675 B2 | 2/2013 | Kagan | |
| 8,407,478 B2 | 3/2013 | Kagan et al. | |
| 8,607,086 B2 | 12/2013 | Cullimore | |
| 8,699,406 B1 * | 4/2014 | Charles | H04J 3/0652 709/248 |
| 8,879,552 B2 | 11/2014 | Zheng | |
| 8,930,647 B1 | 1/2015 | Smith | |
| 9,344,265 B2 | 5/2016 | Kames | |
| 9,397,960 B2 | 7/2016 | Arad et al. | |
| 9,549,234 B1 | 1/2017 | Mascitto | |
| 9,979,998 B1 | 5/2018 | Pogue et al. | |
| 10,014,937 B1 | 7/2018 | Di Mola et al. | |
| 10,027,601 B2 | 7/2018 | Narkis et al. | |
| 10,054,977 B2 | 8/2018 | Mikhaylov et al. | |
| 10,164,759 B1 | 12/2018 | Volpe | |
| 10,320,646 B2 | 6/2019 | Mirsky et al. | |
| 10,637,776 B2 | 4/2020 | Iwasaki | |
| 10,727,966 B1 | 7/2020 | Izenberg et al. | |
| 2001/0006500 A1 | 7/2001 | Nakajima et al. | |
| 2002/0027886 A1 | 3/2002 | Fischer et al. | |
| 2002/0031199 A1 | 3/2002 | Rolston et al. | |
| 2004/0096013 A1 | 5/2004 | Laturell et al. | |
| 2004/0153907 A1 | 8/2004 | Gibart | |
| 2005/0033947 A1 | 2/2005 | Morris et al. | |
| 2005/0268183 A1 | 12/2005 | Barmettler | |
| 2006/0109376 A1 | 5/2006 | Chaffee et al. | |
| 2007/0008044 A1 | 1/2007 | Shimamoto | |
| 2007/0072451 A1 | 3/2007 | Tazawa et al. | |
| 2007/0104098 A1 | 5/2007 | Kimura et al. | |
| 2007/0124415 A1 | 5/2007 | Lev-Ran et al. | |
| 2007/0159924 A1 | 7/2007 | Vook et al. | |
| 2007/0266119 A1 | 11/2007 | Ohly | |
| 2008/0069150 A1 | 3/2008 | Badt et al. | |
| 2008/0285597 A1 | 11/2008 | Downey et al. | |
| 2009/0257458 A1 | 10/2009 | Cui et al. | |
| 2010/0280858 A1 | 11/2010 | Bugenhagen | |
| 2011/0182191 A1 | 7/2011 | Jackson | |
| 2012/0076319 A1 | 3/2012 | Terwal | |
| 2013/0045014 A1 | 2/2013 | Mottahedin et al. | |
| 2013/0215889 A1 | 8/2013 | Zheng et al. | |
| 2013/0294144 A1 | 11/2013 | Wang et al. | |
| 2013/0315265 A1 | 11/2013 | Webb, III et al. | |
| 2014/0153680 A1 | 6/2014 | Garg et al. | |
| 2014/0185632 A1 | 7/2014 | Steiner et al. | |
| 2014/0253387 A1 | 9/2014 | Gunn et al. | |
| 2014/0321285 A1 | 10/2014 | Chew et al. | |
| 2015/0078405 A1 | 3/2015 | Roberts | |
| 2015/0127978 A1 | 5/2015 | Cui et al. | |
| 2015/0318941 A1 | 11/2015 | Zheng et al. | |
| 2016/0072602 A1 | 3/2016 | Earl et al. | |
| 2016/0110211 A1 | 4/2016 | Kames | |
| 2016/0277138 A1 | 9/2016 | Garg et al. | |
| 2016/0315756 A1 | 10/2016 | Tenea et al. | |
| 2017/0005903 A1 | 1/2017 | Mirsky | |
| 2017/0214516 A1 | 7/2017 | Rivaud et al. | |
| 2017/0302392 A1 | 10/2017 | Farra et al. | |
| 2017/0331926 A1 | 11/2017 | Raveh et al. | |
| 2017/0359137 A1 | 12/2017 | Butterworth et al. | |
| 2018/0059167 A1 | 3/2018 | Sharf et al. | |
| 2018/0152286 A1 | 5/2018 | Kemparaj et al. | |
| 2018/0191802 A1 * | 7/2018 | Yang | H04L 1/0018 |
| 2018/0227067 A1 | 8/2018 | Hu et al. | |
| 2018/0309654 A1 | 10/2018 | Achkir et al. | |
| 2019/0007189 A1 | 1/2019 | Hossain et al. | |
| 2019/0014526 A1 | 1/2019 | Bader et al. | |
| 2019/0089615 A1 * | 3/2019 | Branscomb | H04L 69/28 |
| 2019/0149258 A1 | 5/2019 | Araki et al. | |
| 2019/0158909 A1 | 5/2019 | Kulkarni et al. | |
| 2019/0273571 A1 * | 9/2019 | Bordogna | H04L 1/0067 |
| 2019/0319729 A1 | 10/2019 | Leong et al. | |
| 2019/0349392 A1 | 11/2019 | Wetterwald et al. | |
| 2019/0379714 A1 | 12/2019 | Levi et al. | |
| 2020/0162234 A1 | 5/2020 | Almog et al. | |
| 2020/0169379 A1 | 8/2020 | Gaist et al. | |
| 2020/0304224 A1 | 9/2020 | Neugeboren | |
| 2020/0331480 A1 | 10/2020 | Zhang et al. | |
| 2020/0344333 A1 | 10/2020 | Hawari et al. | |
| 2020/0396050 A1 | 12/2020 | Perras et al. | |
| 2020/0401434 A1 | 12/2020 | Thampi et al. | |
| 2021/0218431 A1 | 7/2021 | Narayanan et al. | |
| 2021/0297230 A1 * | 9/2021 | Dror | H04L 69/28 |
| 2021/0318978 A1 * | 10/2021 | Hsung | G06F 13/4031 |
| 2022/0066978 A1 | 3/2022 | Mishra et al. | |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 204138936 A1 | 9/2014 |

OTHER PUBLICATIONS

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Wikipedia—"Precision Time Protocol", pp. 1-8, Aug. 24, 2019.

Levi et al., U.S. Appl. No. 16/779,611, filed Feb. 2, 2020.

Weibel, H., "High Precision Clock Synchronization according to IEEE 1588 Implementation and Performance Issues", Zurich University of Applied Sciences, pp. 1-9, Jan. 17, 2005.

Lu et al., "A Fast CRC Update Implementation", Computer Engineering Laboratory, Electrical Engineering Department, pp. 113-120, Oct. 8, 2003.

(56) References Cited

OTHER PUBLICATIONS

Levi et al., U.S. Appl. No. 16/799,873, filed Feb. 25, 2020.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
U.S. Appl. No. 16/683,309 Office Action dated Sep. 17, 2021.
U.S. Appl. No. 16/920,722 Office Action dated Aug. 12, 2021.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
ITU-T recommendation, "G.8273.2/Y.1368.2—Timing characteristics of telecom boundary clocks and telecom time slave clocks", pp. 1-50, Jan. 2017.
Texas Instruments, "LMK05318 Ultra-Low Jitter Network Synchronizer Clock With Two Frequency Domains," Product Folder, pp. 1-86, Dec. 2018.
Ipclock, "IEEE 1588 Primer," ip-clock.com, pp. 1-3, May 1, 2017 (downloaded from https://web.archive.org/web/20170501192647/http://ip-clock.com/ieee-1588-primer/).
U.S. Appl. No. 17/191,736 Office Action dated Apr. 26, 2022.
U.S. Appl. No. 16/683,309 Office Action dated Mar. 17, 2022.
U.S. Appl. No. 16/779,611 Office Action dated Mar. 17, 2022.
U.S. Appl. No. 17/120,313 Office Action dated Mar. 28, 2022.
EP Application # 21214269 Search Report dated May 2, 2022.
U.S. Appl. No. 17/148,605 Office Action dated May 17, 2022.
EP Application # 22151451.6 Search Report dated Jun. 17, 2022.
U.S. Appl. No. 16/779,611 Office Action dated Jun. 24, 2022.
U.S. Appl. No. 17/120,313 Office Action dated Aug. 29, 2022.
U.S. Appl. No. 17/579,630 Office Action dated Oct. 24, 2022.
U.S. Appl. No. 17/191,736 Office Action dated Nov. 10, 2022.

\* cited by examiner

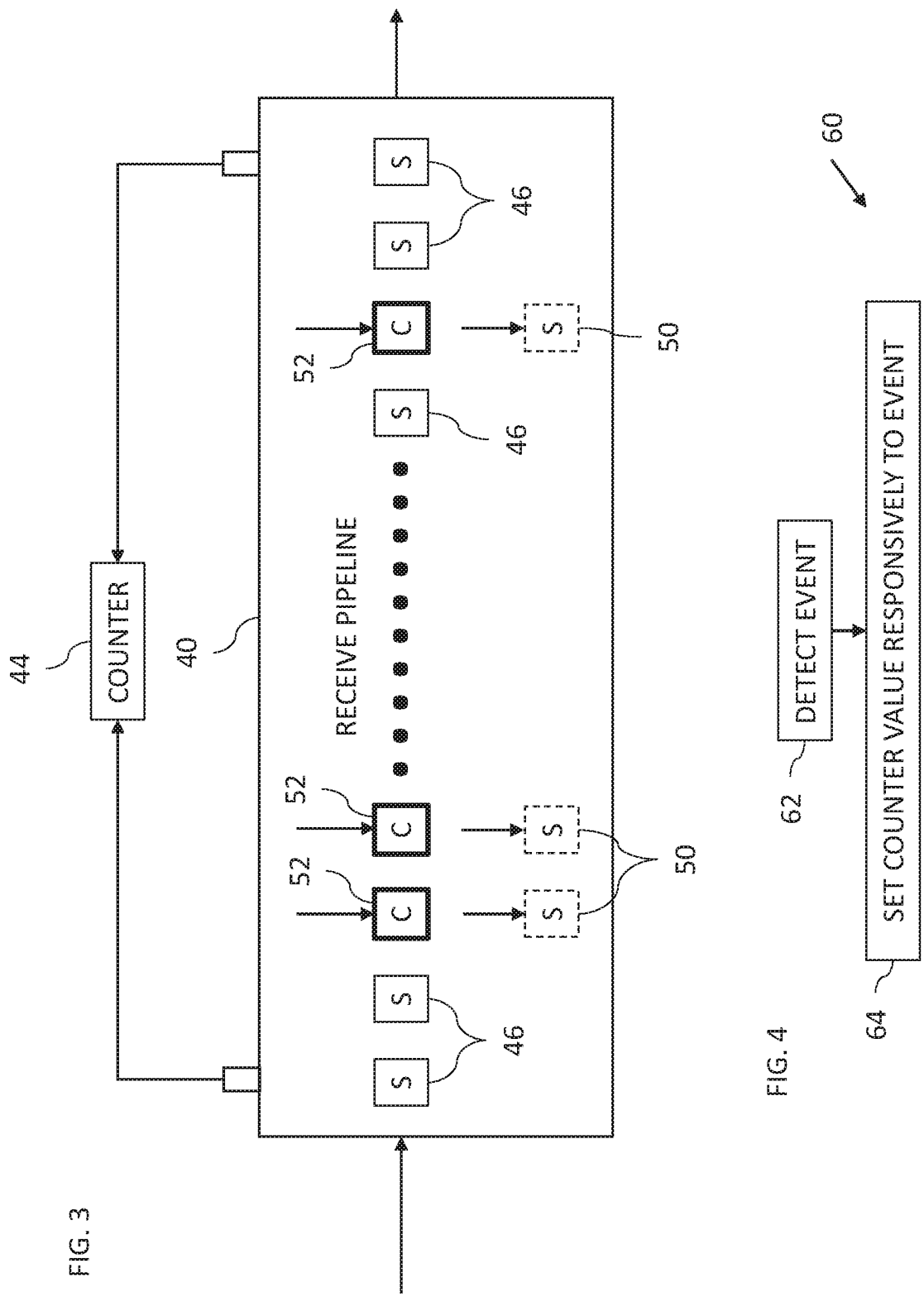

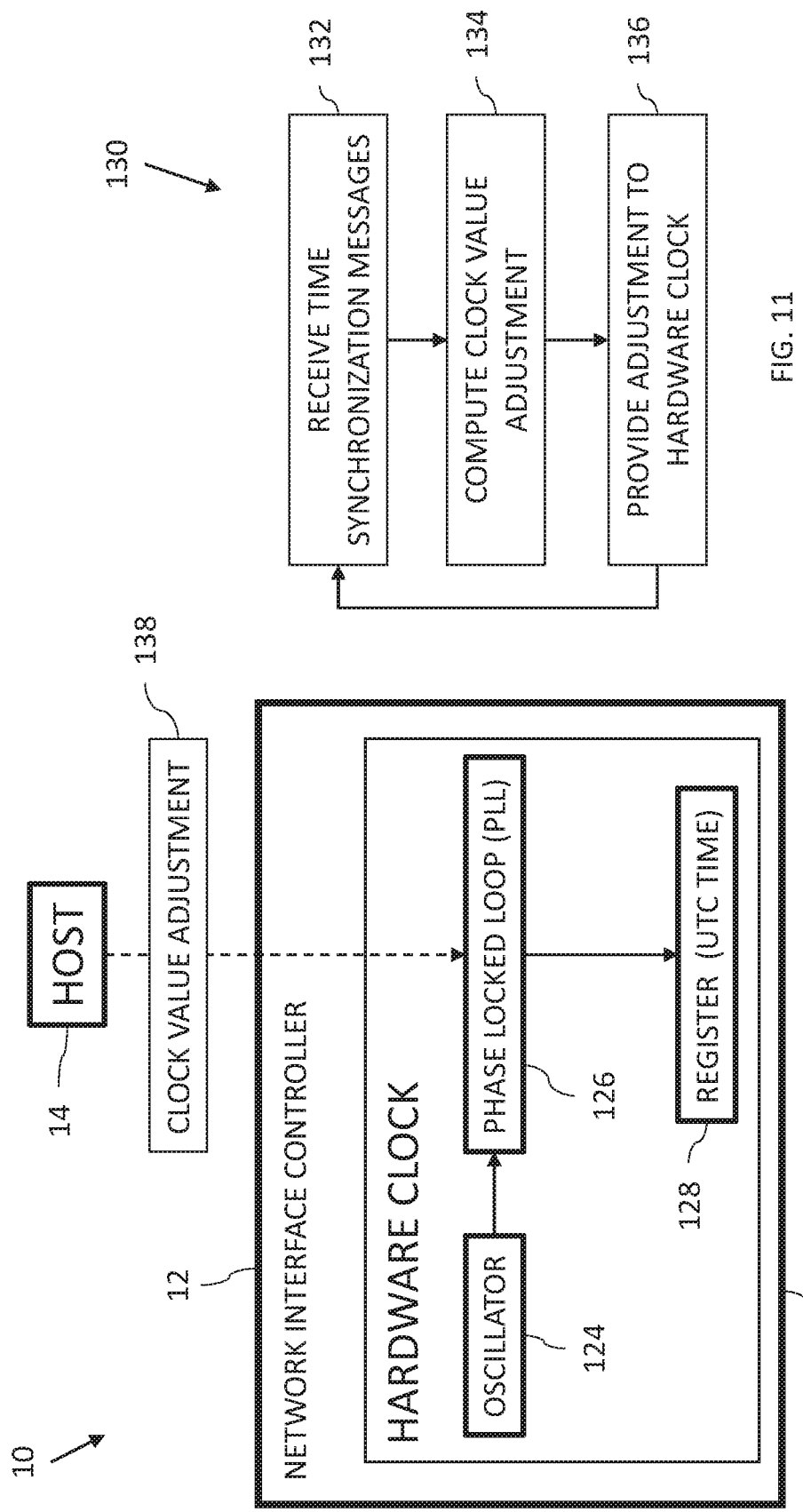

RECEIVE-SIDE TIMESTAMP ACCURACY

FIELD OF THE INVENTION

The present invention relates to network devices, and in particular, but not exclusively to, receive-side processing.

BACKGROUND

In computer networks, each node (such as a switch or endpoint) typically has its own real-time clock. In many applications, it is desirable that the real-time clocks of different nodes be precisely synchronized. Such synchronization can be difficult to achieve, however, due to the latency and jitter involved in distributing clock synchronization messages among the nodes.

The Precision Time Protocol (PTP) was conceived as a solution to this problem. This protocol enables network nodes, using messaging between the nodes and a master device, to determine the offset of their respective clocks to levels of accuracy in the nanosecond range. For maximum accuracy in measuring the clock offsets, hardware-based time stamping is generally used, as described, for example, by Weibel and Bechaz in "Implementation and Performance of Time Stamping Techniques," 2004 Conference on IEEE 1588 (Sep. 28, 2004), which is incorporated herein by reference. A PTP hardware clock (PHC) is a hardware clock (e.g., including an oscillator and a counter), which runs according to PTP format. The PHC is synchronized to a master in the network.

Successfully running the PTP protocol generally needs accurate timestamping for received packets so that the timestamping point is not affected by the load of the network or the CPU load of the receiving node. From this reason, hardware timestamping in a network interface controller (NIC) or other network node, is generally better than software timestamping, which may suffer from CPU load inaccuracy, whereas hardware timestamping is more accurate and stable.

An example, synchronization is now described. In a first step, frequency is syntonized. A master device sends a synchronization message at time t1 that arrives at a slave device at time t2. The master device sends a synchronization message at time t3 that arrives at the slave device at time t4. The slave device computes drift based on:

[t4−t2−(t3−t1)]/(t3−t1).

The slave device may then adjust its clock based on drift to syntonize the frequency of its clock.

The master device then sends another synchronization message at time t5 that is received by the slave device at time 6. The slave device then sends a delay request message at time t7. The master device then sends another message at time t8 that includes the time that the delay request was received by the master device. The slave device may compute the round-trip time as equal to:

t8−t5−(t7−t6).

Therefore, the one-way delay from the master device to the slave device is given by:

[t8−t5−(t7−t6)]/2.

Then, the master device sends another message at time t9. When the slave device receives the message at t10, the slave device knows that the phase is t10 plus the one-way delay.

U.S. Pat. No. 8,370,675 to Kagan describes a method for clock synchronization includes computing an offset value between a local clock time of a real-time clock circuit and a reference clock time, and loading the offset value into a register that is associated with the real-time clock circuit. The local clock time is then summed with the value in the register so as to give an adjusted value of the local clock time that is synchronized with the reference clock.

SUMMARY

There is provided in accordance with an embodiment of the present disclosure, a network device, including a network interface port configured to receive data symbols from a network node over a packet data network, at least some of the symbols being included in data packets, and controller circuitry including physical layer (PHY) circuitry, which includes receive PHY pipeline circuitry configured to process the received data symbols, and a counter configured to maintain a counter value indicative of a number of the data symbols in the receive PHY pipeline circuitry.

Further in accordance with an embodiment of the present disclosure the receive PHY pipeline circuitry is configured to identify a start of frame delimiter of one of the data packets, and compute a timestamp of the identified start of frame delimiter.

Still further in accordance with an embodiment of the present disclosure the data packet of the identified start of frame delimiter includes a cyclic redundancy check (CRC) field populated with a first CRC code, wherein the controller circuitry is configured to check the first CRC code, compute a second CRC code responsively to the data packet, the second CRC code being shorter than the first CRC code, and insert the second CRC code and the computed timestamp in the CRC field in place of the first CRC code.

Additionally, in accordance with an embodiment of the present disclosure the data packet of the identified start of frame delimiter includes a time synchronization message received from a master clock in the packet data network.

Moreover in accordance with an embodiment of the present disclosure, the device includes a hardware clock configured to maintain a clock value, wherein the receive PHY pipeline circuitry configured to process arrival of the received data symbols a given symbol timing, and compute the timestamp of when the identified start of frame delimiter entered the receive PHY pipeline circuitry, responsively to the clock value reduced by an adjustment based on the counter value and the symbol timing, and the controller circuitry is configured to assign the computed timestamp to one of the data packets of the identified start of frame delimiter.

Further in accordance with an embodiment of the present disclosure the controller circuitry is configured to compute an expanded timestamp responsively to the computed timestamp and a current clock value of the hardware clock, and generate a control message including the expanded timestamp.

Still further in accordance with an embodiment of the present disclosure the receive PHY pipeline circuitry is configured to compute the adjustment responsively to the counter value divided by a symbol frequency of the symbols.

Additionally, in accordance with an embodiment of the present disclosure the receive PHY pipeline circuitry is configured to compute the adjustment responsively to the counter value multiplied by a symbol period of the symbols.

Moreover, in accordance with an embodiment of the present disclosure the receive PHY pipeline circuitry is configured to process the symbols with a non-constant delay such that different respective ones of the symbols reside in the receive PHY pipeline circuitry for respective different lengths of time.

Further in accordance with an embodiment of the present disclosure the counter is configured to increment the counter value responsively to ones of the symbols entering the receive PHY pipeline circuitry, and decrement the counter value responsively to ones of the symbols exiting the receive PHY pipeline circuitry.

Still further in accordance with an embodiment of the present disclosure the receive PHY pipeline circuitry is configured to set the counter value responsively to an event, which indicates a given number of the symbols in the receive PHY pipeline circuitry, and the given number of the symbols.

Additionally, in accordance with an embodiment of the present disclosure the event including achieving block lock in the receive PHY pipeline circuitry.

Moreover, in accordance with an embodiment of the present disclosure the event including achieving lock of a forward error correction (FEC) block in the receive PHY pipeline circuitry, and the given number is a size of the FEC block.

Further in accordance with an embodiment of the present disclosure the counter is configured to decrement the counter value responsively to ones of the symbols consumed in the receive PHY pipeline circuitry.

Still further in accordance with an embodiment of the present disclosure the receive PHY pipeline circuitry is configured to decrement the counter value responsively to when the consumed symbols would have reached the counter along the receive PHY pipeline circuitry if the consumed symbols were still in the receive PHY pipeline circuitry.

Additionally, in accordance with an embodiment of the present disclosure the receive PHY pipeline circuitry is configured to insert respective control signals in the receive PHY pipeline circuitry at respective positions in the receive PHY pipeline circuitry from where respective ones of the consumed symbols are removed from the receive PHY pipeline circuitry.

There is also provided in accordance with another embodiment of the present disclosure, a computer system, including network device, including a network interface port configured to receive data symbols from a network node over a packet data network, at least some of the symbols being included in data packets, a hardware clock configured to maintain a clock value, and controller circuitry including physical layer (PHY) circuitry, which includes receive PHY pipeline circuitry configured to process arrival of the received data symbols a given symbol timing, and identify a start of frame delimiter of one of the data packets, and a counter to maintain a counter value indicative of a number of the data symbols in the receive PHY pipeline circuitry, wherein the receive PHY pipeline circuitry is configured to compute a timestamp of when the identified start of frame delimiter entered the receive PHY pipeline circuitry responsively to the clock value reduced by a first adjustment based on the counter value and the symbol timing, and the controller circuitry is configured to assign the computed timestamp to one of the data packets of the identified start of frame delimiter, the data packet of the identified start of frame delimiter including a time synchronization message received from a master clock in the packet data network, and a host device including a processor configured to run software instructions to receive the time synchronization message and compute a second adjustment to the clock value of the hardware clock responsively to the time synchronization message, wherein the hardware clock is configured to adjust the clock value responsively to the computed second adjustment.

Moreover, in accordance with an embodiment of the present disclosure the counter is configured to increment the counter value responsively to ones of the symbols entering the receive PHY pipeline circuitry, and decrement the counter value responsively to ones of the symbols exiting the receive PHY pipeline circuitry.

Further in accordance with an embodiment of the present disclosure the receive PHY pipeline circuitry is configured to set the counter value responsively to an event, which indicates a given number of the symbols in the receive PHY pipeline circuitry, and the given number of the symbols.

Still further in accordance with an embodiment of the present disclosure the counter is configured to decrement the counter value responsively to ones of the symbols consumed in the receive PHY pipeline circuitry.

Additionally, in accordance with an embodiment of the present disclosure the receive PHY pipeline circuitry is configured to decrement the counter value responsively to when the consumed symbols would have reached the counter along the receive PHY pipeline circuitry if the consumed symbols were still in the receive PHY pipeline circuitry.

There is also provided in accordance with still another embodiment of the present disclosure, a networking method, including receiving data symbols from a network node over a packet data network, at least some of the symbols being included in data packets, maintaining a clock value, processing arrival of the received data symbols a given symbol timing, identifying a start of frame delimiter of one of the data packets, maintaining a counter value indicative of a number of the data symbols in receive PHY pipeline circuitry, computing a timestamp of when the identified start of frame delimiter entered the receive PHY pipeline circuitry responsively to the clock value reduced by an adjustment based on the counter value and the symbol timing, and assigning the computed timestamp to one of the data packets of the identified start of frame delimiter.

BRIEF DESCRIPTION OF THE DRAWINGS

The present invention will be understood from the following detailed description, taken in conjunction with the drawings in which:

FIG. 3 is a block diagram view of the PHY receive pipeline circuitry consuming symbols in the system of FIG. 1;

FIG. 4 is a flowchart including steps in a counter reset method in the system of FIG. 1;

FIG. 10 is a block diagram of a hardware clock in the system of FIG. 1; and

FIG. 11 is a flowchart including steps in a time synchronization method in the system of FIG. 1.

DESCRIPTION OF EXAMPLE EMBODIMENTS

Overview

Figure 1:
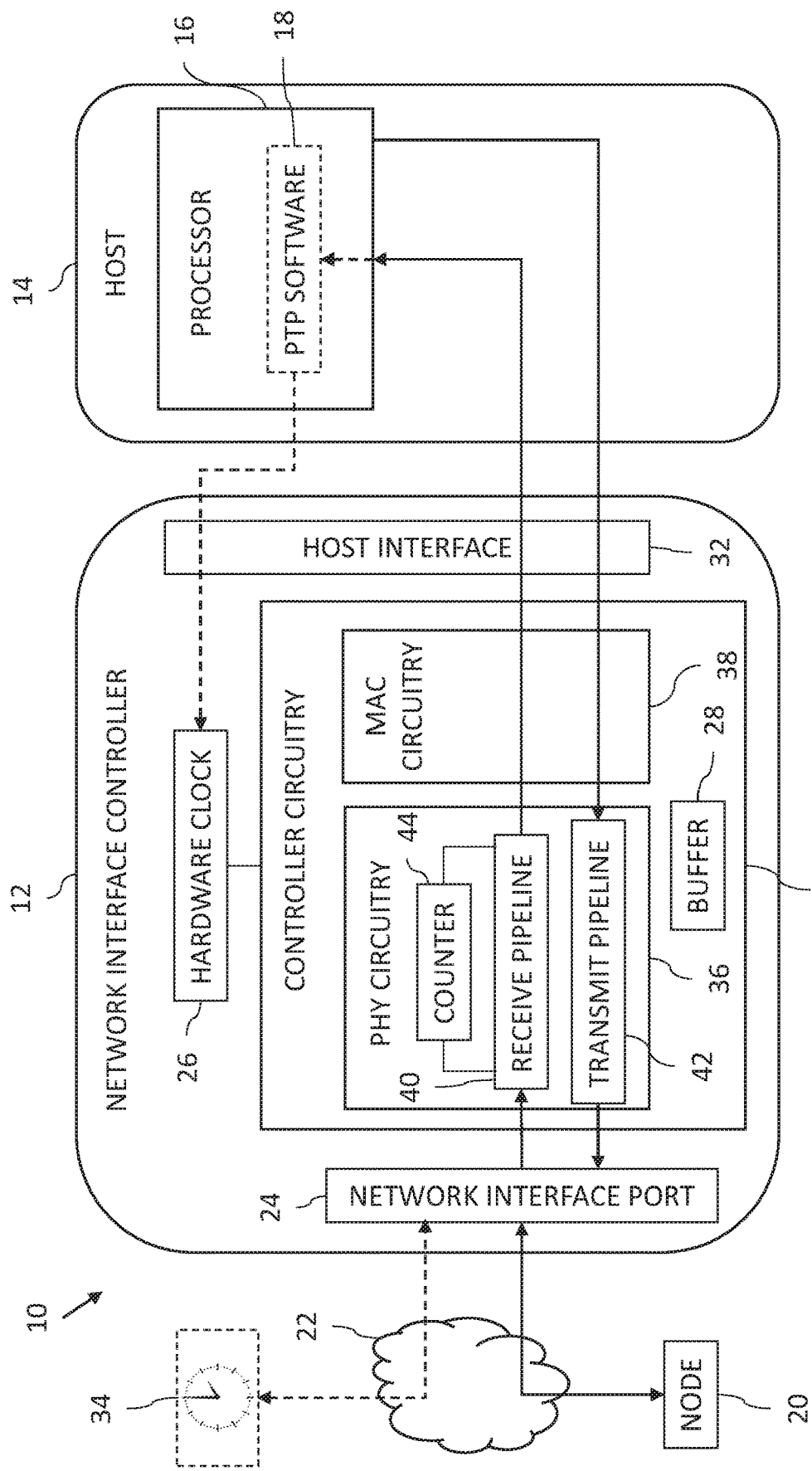
FIG. 1 is a block diagram view of a computer system constructed and operative in accordance with an embodiment of the present invention.

As previously mentioned, successfully running the PTP protocol generally needs accurate timestamping for received packets so that the timestamping point is not affected by load of the network or central processing unit (CPU) processing of the PTP packets. From this reason, hardware timestamping in a network interface controller (NIC) or other network node, is generally better than software timestamping, which may suffer from CPU load inaccuracy.

In many applications, even hardware timestamping may not provide higher accuracy, for example, up to a picosecond, as the hardware processing does not process packets in a single step, but rather along a long and complicated pipeline, which may have a typical delay of about 1 microsecond.

Therefore, in order to remove errors caused by the long and complicated pipeline, it is desired to compute timestamps as close to the beginning of the pipeline as possible before buffering and latency has occurred. In the receive side of the device, the beginning of the pipeline is generally in the physical layer (PHY).

Timestamping early in the PHY is challenging as the PHY processes received symbols but does not process at the packet level. Only later in the PHY, after latency has already occurred, start of frame delimiters (SFDs) identifying the start of packets may be identified. The IEEE 1588 standard defines the timestamp of a packet as the timestamp of the SRD of that packet. However, even if the start of packets may be identified in the PHY, the nature of the packets, e.g., PTP packets versus other packets is not known. Additionally, in the PHY layer, the arrival time of symbols is not easy to compute due to receiving raw bits prior to lane de-skewing, scrambling, and forward error correction (FEC) encoding.

On the other hand, if timestamping is performed after packet framing, accuracy is compromised since latency of the pipeline may not be constant and may suffer from high jitter due to Physical Coding Layer (PCS) markers, FEC parity, FEC store-and-forward and any buffering in the pipeline.

Some network devices (e.g., NICs or switches) may include a constant delay PHY pipeline. Therefore, a solution for a device with a constant delay PHY pipeline is to compute the timestamp for an SFD at the end of the PHY pipeline based on deducting the constant delay of the PHY pipeline from the current time given by a local clock.

However, other network devices include a variable delay PHY pipeline, which leads to high performance and provides lower latency. However, for such variable delay devices, the above timestamping method may not provide enough accuracy when computing timestamps.

Embodiments of the present invention solve the above problems by providing a network device that computes a timestamp in a receive PHY pipeline using a counter, which maintains a counter value of the number of data symbols in the pipeline. After an SFD is identified, a timestamp for the SFD may be computed towards the end of the PHY pipeline based on the current time (as given by a local clock) and the time that the data symbol of the SFD has spent in the pipeline. Although the pipeline delay may be variable, the arrival of each data symbol is processed (e.g., input into the pipeline) according to a given symbol timing, for example, according to a symbol rate dictated by a communication protocol operated by the network device. Therefore, the number of symbols in the pipeline as given by the counter value, and the given symbol timing may be used to compute the time spent by the data symbol of the SFD in the pipeline. The timestamp may then be computed based on the current time less the time spent by the data symbol of the SFD in the pipeline. Therefore, the timestamp is computed in the PHY layer, which is generally the last opportunity to obtain accurate delay information in the processing pipeline of the network device.

The PHY layer does not parse packets and does not identify PTP packets for example. The timestamp may then be added to the packet associated with the identified SFD after the packet is recognized after the PHY layer in the network device. In some embodiments, the timestamp is added to each SFD, so that each packet is accurately timestamped. Therefore, when PTP packets are identified at a later stage in the processing, each PTP packet has an accurate timestamp. In some embodiments, an existing packet field such as a cyclic redundancy check (CRC) field may be used to store the timestamp. The existing CRC code in the CRC field may be checked and if the check is successful, a replacement shorter CRC code may be computed. The replacement CRC code may then be stored with the computed timestamp in the CRC field.

In some embodiments, the computed timestamp may only include the least significant bits (LSBs) of time associated with the entry of the SFD into the pipeline. The most significant bits (MSBs) of the time associated with the entry of the SFD into the pipeline may be stored elsewhere. At a later stage, the computed timestamp may be expanded using the stored value. The expanded timestamp may be added to a control message for forwarding to a host, for example, for use in accurately processing PTP synchronization messages. In some embodiments, the MSBs do not need to be explicitly saved, as the time of the local clock (when the timestamp is expanded) will include the MSBs based on the assumption that the delay between computing the timestamp and expanding the timestamp is short enough.

The counter is incremented for data symbols entering the PHY pipeline and decremented for data symbols exiting the PHY pipeline towards media access control (MAC) circuitry. However, maintaining an accurate count of the number of data symbols in the pipeline is not a trivial task. This is due to various factors, including data symbols such as service bits (e.g., markers, FEC parity etc.) being consumed in the PHY pipeline and not exiting the PHY pipeline. The consumed data symbols are identified and accounted for by the counter. The counter is decremented for the consumed data symbols according to the time when the consumed data symbols would exit the PHY pipeline if the consumed data bits were still in the PHY pipeline at that point. Respective control signals may be inserted at respective positions in the PHY pipeline from where respective consumed symbols are removed from the PHY pipeline.

Another factor is knowing when and how to reset the counter as prior to achieving block-lock, symbols are received by the PHY pipeline, but symbols are generally not released from the pipeline until after block-lock is achieved. Block lock is defined as completing a linkup process, which may include locking onto to an incoming bit stream, align to where a block starts and ends, and de-skewing over several lanes. Therefore, running the counter prior to block-lock could easily lead to counter overrun and/or non-meaningful counter values. Therefore, the counter generally is not run from a startup state when it may be known that the pipeline is empty. Instead, the counter is reset responsively to identifying an event associated with a known value (or a good estimate of the value) of the number of symbols in the PHY pipeline. One such event is on achieving FEC lock, when it is known that the number of symbols in the PHY pipeline is equal to, or very close to, the known size of a FEC block associated with the FEC lock.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Reference is now made to FIG. 1, which is a block diagram view of a computer system 10 constructed and operative in accordance with an embodiment of the present invention. The computer system 10 includes a network device 12 (e.g., a NIC) connected to a host computer 14. The host computer 14 includes a processor 16 to perform various processing tasks, optionally including running PTP software 18, described in more detail with reference to FIGS. 10 and 11. In practice, some or all of the functions of the processor 16 may be combined in a single physical component or, alternatively, implemented using multiple physical components. These physical components may comprise hard-wired or programmable devices, or a combination of the two. In some embodiments, at least some of the functions of the processor 16 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

In some embodiments, the functionality of the network device 12 and the host computer 14 may be combined in any suitable network device, for example, a network switch including a CPU which runs PTP software.

The network device 12 includes a network interface port 24, a hardware clock 26, a buffer 28, controller circuitry 30, and a host interface 32.

The network interface port 24 is configured to receive data symbols from a network node 20 over a packet data network 22. At least some of the symbols are comprised in data packets. In some embodiments, the network interface port 24 is configured to receive data symbols comprised in PTP synchronization messages from a master clock device 34.

The hardware clock 26 is configured to maintain a clock value, according to any suitable time standard, such as Coordinated Universal Time (UTC). The hardware clock 26 is described in more detail with reference to FIGS. 10 and 11. The buffer 28 is configured to store data used by the various elements of the network device 12. The host interface 32 is configured to transfer data between the network device 12 and the host computer 14. The host interface 32 may include any suitable interface, for example, but not limited to, a peripheral component interconnect express (PCIe) interface.

The controller circuitry 30 includes physical layer (PHY) circuitry 36 and MAC circuitry 38. The PHY circuitry 36 is configured to process data symbols at the physical layer. The MAC circuitry 38 is configured to process packets at the data-link layer in a receive and transmit pipeline (not shown). The controller circuitry 30 may perform other forwarding and processing functions.

The PHY circuitry 36 includes receive PHY pipeline circuitry 40 and transmit pipeline circuitry 42, for processing received data symbols, and data symbols to be transmitted, respectively. The PHY circuitry 36 also includes a counter 44 to maintain a counter value indicative of a number of the data symbols in the receive PHY pipeline circuitry 40. The receive PHY pipeline circuitry 40 is described in more detail with reference to FIGS. 2-5B.

Figure 2:
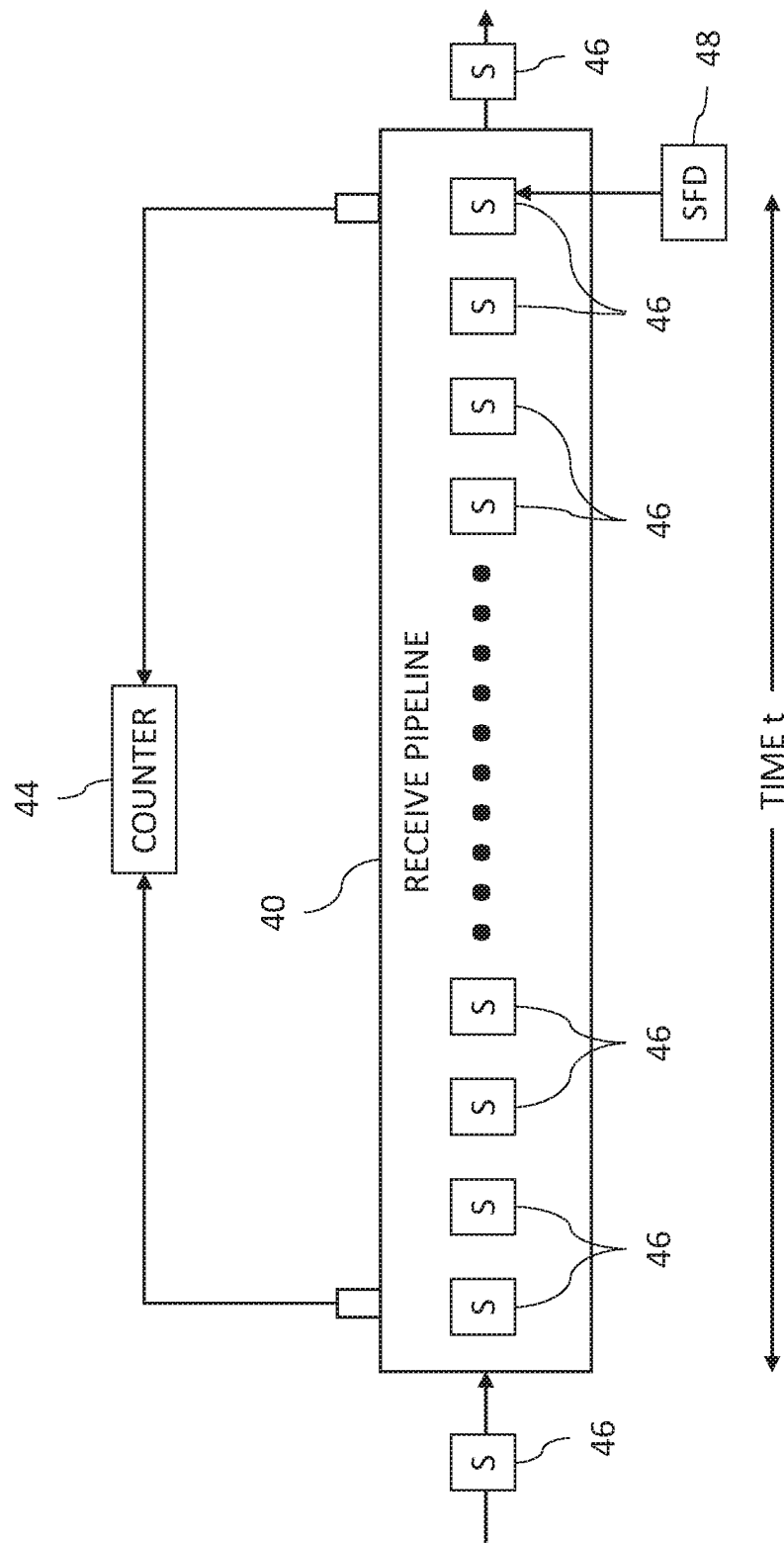
FIG. 2 is a block diagram view of PHY receive pipeline circuitry processing symbols in the system of FIG. 1.

Reference is now made to FIG. 2, which is a block diagram view of the receive PHY pipeline circuitry 40 processing data symbols 46 in the system 10 of FIG. 1. FIG. 2 shows data symbols 46 entering the receive PHY pipeline circuitry 40 on the left and exiting the pipeline on the right. The counter 44 is coupled to the receive PHY pipeline circuitry 40, and is configured to increment the counter value responsively to symbols 46 entering the receive PHY pipeline circuitry 40 (from the network interface port 24 (FIG. 1), and decrement the counter value responsively to symbols 46 exiting the receive PHY pipeline circuitry 40 (towards the MAC circuitry 38 (FIG. 1).

FIG. 2 shows one of the data symbols 46 identified as an SFD 48. The receive PHY pipeline circuitry 40 is generally configured to detect each SFD, even ones which may be dropped in the MAC circuitry 38. Detection of the SFDs may be performed at a late stage in the receive PHY pipeline circuitry 40. The symbol rate at which the data symbols 46 enter the receive PHY pipeline circuitry 40 is constant and known. Therefore, at the end of the receive PHY pipeline circuitry 40, the time t that the data symbol 46 of the SFD 48 has spent in the receive PHY pipeline circuitry 40 is proportional to the number of data symbols 46 currently in the pipeline as given by the counter value maintained by the counter 44. As the symbol rate is known, the time t may be computed responsively to the current counter value and the symbol rate. The time t may be used to compute the time when the identified SFD 48 entered the receive PHY pipeline circuitry 40 as described in more detail with reference to FIGS. 5A-B.

Reference is now made to FIG. 3, which is a block diagram view of the receive PHY pipeline circuitry 40 consuming symbols 50 in the system 10 of FIG. 1. Some of the data symbols 46 entering the receive PHY pipeline circuitry 40 are processed by the receive PHY pipeline circuitry 40 and exit the receive PHY pipeline circuitry 40 towards the MAC circuitry 38 (FIG. 1). Other symbols 46 enter the receive PHY pipeline circuitry 40 and are consumed within the receive PHY pipeline circuitry 40 and do not exit the receive PHY pipeline circuitry 40 towards the MAC circuitry 38. Some consumed symbols 50 are shown by way of example in FIG. 3. The consumed symbols 50 are replaced by control signals 52, as described in more detail below. Examples of consumed symbols 50 are service bits (e.g., marker, FEC parity bits etc.). The consumed symbols 50 may be detected based on the presence of other data. For example, when a FEC block is detected, the receive PHY pipeline circuitry 40 knows that there were parity symbols which were removed and the receive PHY pipeline circuitry 40 will therefore compensate for the FEC parity symbols which were removed, for example, by adding the control signals 52 to the receive PHY pipeline circuitry 40. The markers may be physical layer symbols which are consumed by the receive PHY pipeline circuitry 40 and not forwarded to the MAC circuitry 38.

When the control signals 52 reach the end of the receive PHY pipeline circuitry 40, the control signals 52 will be counted as a symbol which is exiting the receive PHY pipeline circuitry 40 and the counter value will be decremented accordingly.

Therefore, the receive PHY pipeline circuitry 40 is configured to decrement the counter value responsively to when the consumed symbols 50 would have reached the counter 44 along the receive PHY pipeline circuitry 40 if the consumed symbols 50 were still in the receive PHY pipeline circuitry 40 at that point. In some embodiments, the receive PHY pipeline circuitry 40 is configured to insert respective control signals 52 in the receive PHY pipeline circuitry 40 at respective positions in the receive PHY pipeline circuitry 40 from where respective consumed symbols 50 are removed from the receive PHY pipeline circuitry 40. The counter 44 is configured to decrement the counter value responsively to the symbols 50 being consumed in the receive PHY pipeline circuitry 40.

Reference is now made to FIG. 4, which is a flowchart 60 including steps in a counter reset method in the system 10 of FIG. 1. Knowing when and how to reset the counter 44 (FIG. 3) is non-trivial, as prior to achieving block-lock, symbols 46 are received by the receive PHY pipeline circuitry 40, but symbols 46 are generally not released from the receive PHY pipeline circuitry 40 until after block-lock is achieved. Therefore, running the counter 44 prior to block-lock could easily lead to counter overrun and/or non-meaningful counter values as the counter does not decrement prior to block lock. Therefore, the counter 44 generally is not run from a startup state when it may be known that the receive PHY pipeline circuitry 40 is empty. Instead, the counter 44 is reset responsively to identifying an event associated with a known value (or a good estimate of the value) of the number of symbols 46 in the receive PHY pipeline circuitry 40. One such event is achieving FEC lock, when in order to achieve FEC lock, some markers are identified and an entire FEC block is accumulated to check the parity of the FEC block. Therefore, on achieving FEC lock it is known that the number of symbols in the receive PHY pipeline circuitry 40 is equal to, or very close to, the known size of a FEC block accumulated in the receive PHY pipeline circuitry 40. Another such event is achieving block lock when it can be estimated how many data symbols are in each lane of the receive PHY pipeline circuitry 40. The counter 44 is then reset to the known or estimated number of symbols 46 in the receive PHY pipeline circuitry 40 for that event. In general, per protocol, certain events provide a very good estimation of the number of bits inside the receive PHY pipeline circuitry 40.

Therefore, the receive PHY pipeline circuitry 40 is configured to detect (block 62) an event (e.g., achieving block lock in the receive PHY pipeline circuitry 40, or achieving lock of a FEC block in the receive PHY pipeline circuitry 40) which indicates a given number (e.g., size of the FEC block) of the symbols 46 in the receive PHY pipeline circuitry 40, and set (block 64) the counter value responsively to detecting the event and set the counter value responsively to the given (known or estimated) number of symbols 46 in the receive PHY pipeline circuitry 40 associated with the detected event.

Figure 5A:
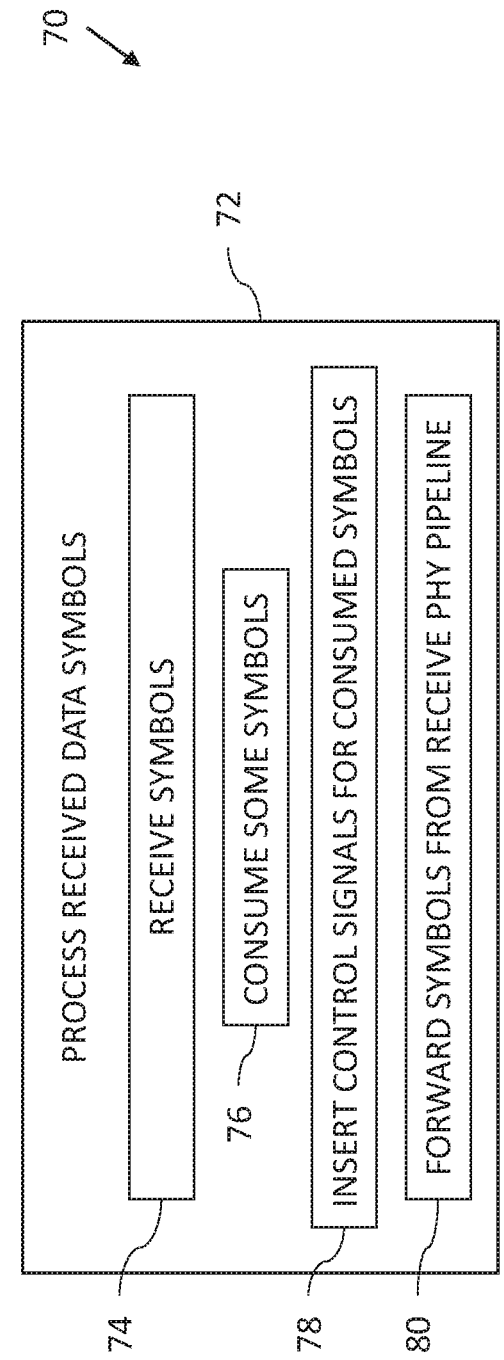
FIGS. 5A-B are flowcharts including steps in a timestamp computation method in the system of FIG. 1.
Figure 5B:
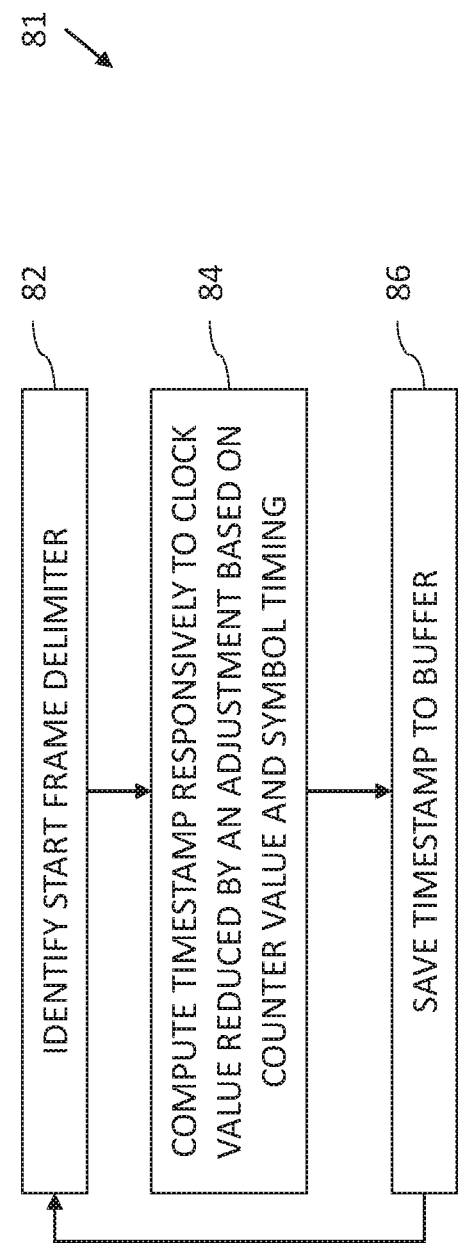

FIGS. 5A-B are flowcharts 70, 81 including steps in a timestamp computation method in the system 10 of FIG. 1. Reference is now made to FIG. 5A. Reference is also made to FIG. 3.

The receive PHY pipeline circuitry 40 is configured to process arrival of the received data symbols according to a given symbol timing. The receive PHY pipeline circuitry 40 is configured to process (block 72) the data symbols 46 at the physical layer. The receive PHY pipeline circuitry 40 is configured to process the symbols 46 with a non-constant delay such that different respective symbols 46 reside in the receive PHY pipeline circuitry 40 for respective different lengths of time.

Sub-steps of the step of block 72 are now described in more detail. The receive PHY pipeline circuitry 40 is configured to receive (block 74) data symbols 46 from the network interface port 24 (FIG. 1). The receive PHY pipeline circuitry 40 is configured to consume (block 76) some of the data symbols 46. The receive PHY pipeline circuitry 40 is configured to insert (block 78) respective control signals 52 in the receive PHY pipeline circuitry 40 at respective positions in the receive PHY pipeline circuitry 40 from where respective consumed symbols 50 are removed from the receive PHY pipeline circuitry 40. In this way, the receive PHY pipeline circuitry 40 is configured to decrement the counter value responsively to when the consumed symbols 50 would have reached the counter 44 along the receive PHY pipeline circuitry 40 if the consumed symbols were still in the receive PHY pipeline circuitry 40. The receive PHY pipeline circuitry 40 is configured to forward (block 80) data symbols 46 which were not consumed from the receive PHY pipeline circuitry 40 to the MAC circuitry 38.

The steps of blocks 74 to 80 are generally performed at and/or around the same time. For example, as data symbols 46 are entering the receive PHY pipeline circuitry 40, other data symbols 46 are being processed and/or consumed by the receive PHY pipeline circuitry 40, and other data symbols 46 are exiting the receive PHY pipeline circuitry 40 towards the MAC circuitry 38 (FIG. 1).

Reference is now made to FIG. 5B. Reference is also made to FIG. 3. The receive PHY pipeline circuitry 40 is configured to identify (block 82) an SFD of one of the data packets. The receive PHY pipeline circuitry 40 is configured to compute (block 84) a timestamp of when the identified SFD entered the receive PHY pipeline circuitry 40 responsively to the current clock value (maintained by the hardware clock 26) and reduced by an adjustment based on the counter value and the symbol timing. In some embodiments, the receive PHY pipeline circuitry 40 is configured to compute the adjustment responsively to the counter value divided by a symbol frequency of the symbols 46. In other embodiments, the receive PHY pipeline circuitry 40 is configured to compute the adjustment responsively to the counter value multiplied by a symbol period of the symbols.

The receive PHY pipeline circuitry 40 is configured to save (block 86) the timestamp to the buffer 28 (FIG. 1). The timestamp is subsequently retrieved from the buffer 28 and added to the packet of the identified SFD, as described in more detail with reference to FIGS. 6 and 7. The steps of blocks 82-86 are repeated for subsequent SFDs.

The timestamp may be represented by the LSBs of the current time adjusted by the computed adjustment (e.g., based on the counter value and the symbol rate). The MSBs of the current time adjusted by the computed adjustment may be added to the timestamp at a later stage, as described in more detail with reference to FIGS. 8 and 9. The most significant bits (MSBs) of the current time adjusted by the computed adjustment may be stored elsewhere. In some embodiments, the MSBs do not need to be explicitly saved, as the current time of the hardware clock 26 (when the timestamp is expanded in a later stage) will include the MSBs based on the assumption that the delay between computing the timestamp and expanding the timestamp is short enough.

Figure 6:
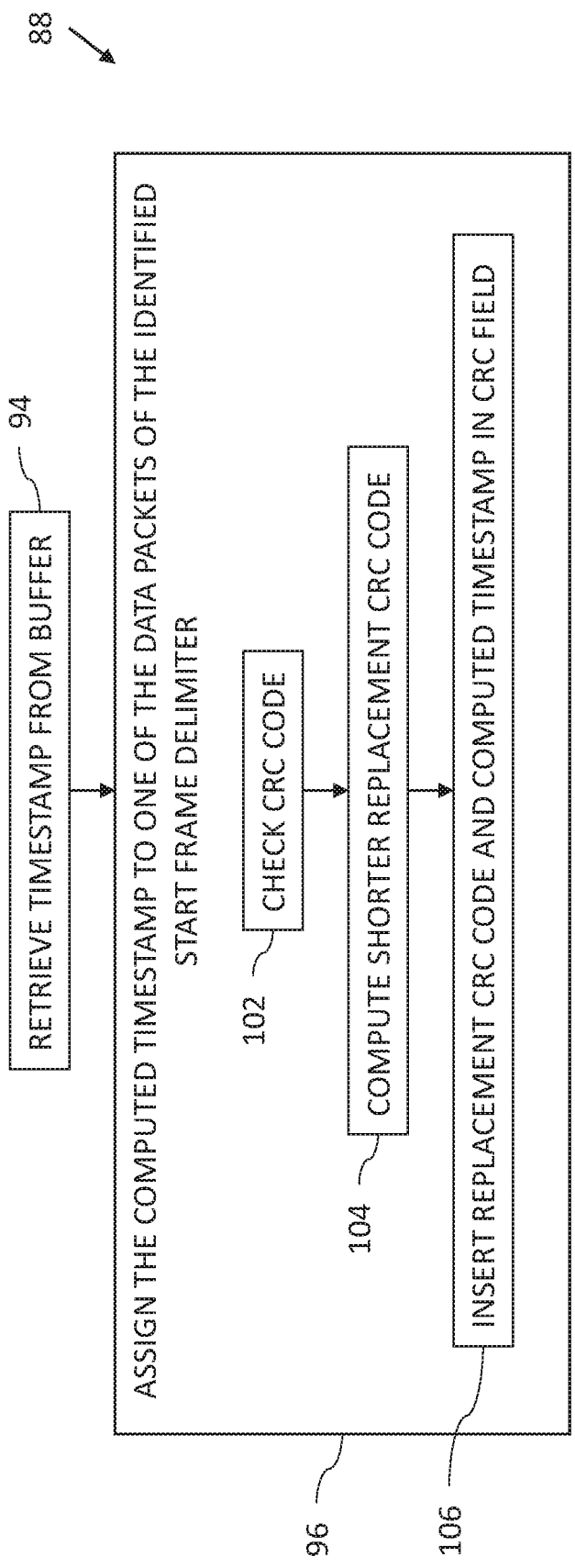
FIG. 6 is a flowchart including steps in a method to assign the computed timestamp to a data packet in the system of FIG. 1.
Figure 7:
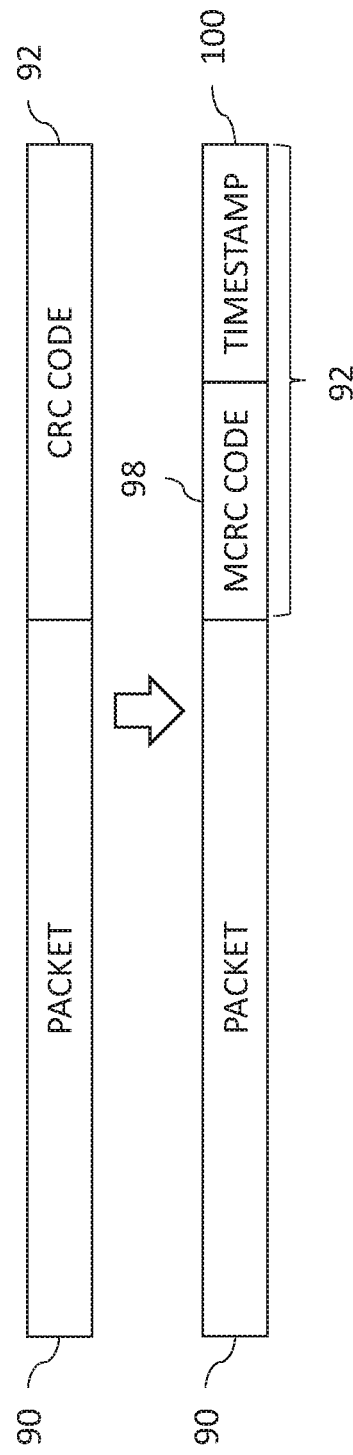
FIG. 7 is a block diagram illustrating the method of FIG. 6.

Reference is now made to FIGS. 6 and 7. FIG. 6 is a flowchart 88 including steps in a method to assign the computed timestamp to a data packet 90 in the system 10 of FIG. 1. Reference is now made to FIG. 7 is a block diagram illustrating the method of FIG. 6.

When the identified SFD exits the receive PHY pipeline circuitry 40, and typically prior to entering the MAC circuitry 38 (FIG. 1), the controller circuitry 30 (FIG. 1) is configured to retrieve (block 94) a computed timestamp 100 from the buffer 28 (FIG. 1). The controller circuitry 30 is configured to assign (block 96) the computed timestamp 100 to the data packet 90 of the identified SFD. One reason that the timestamps are added to the data packets associated with identified SFDs is in order to allow full wire speed (line rate) of accurate timestamped packets.

In order to add the timestamp 100 to the data packet 90 without extending the data path, the computed timestamp 100 may be added to an existing field of the data packet 90 such as, a CRC field 92. For the sake of example, it has been assumed that the CRC field 92 has a length of 32 bits and the computed timestamp 100 has a length of 26 bits. However, in some implementations the CRC field 92 and the computed timestamp 100 may have any suitable length.

The CRC field 92 is populated with an existing CRC code (for example of 32 bits). Therefore, the existing CRC code may be replaced by a shorter CRC code 98 (e.g., of 6 bits) and the computed timestamp 100 (e.g., of 26 bits).

Therefore, the controller circuitry 30 is configured to: check (block 102) the existing CRC code; compute (block 104) the shorter replacement CRC code 98 responsively to the data packet (using any suitable CRC algorithm); and insert the shorter replacement CRC code 98 and the computed timestamp 100 in the CRC field 92 in place of the existing CRC code.

Figure 8:
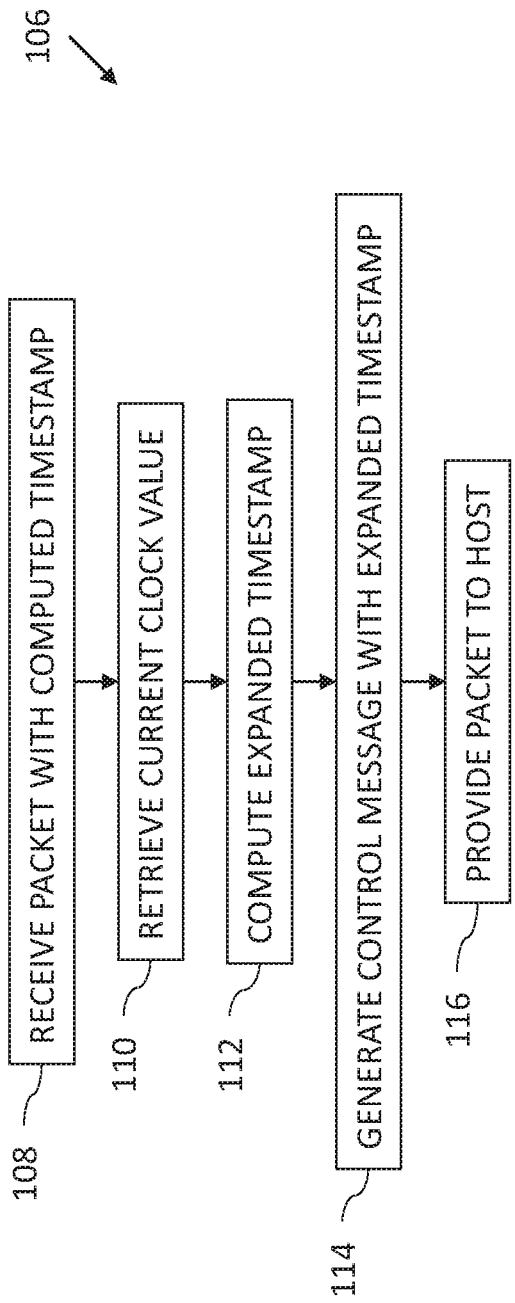
FIG. 8 is a flowchart including steps in a method to expand the computed timestamp in the system of FIG. 1.
Figure 9:
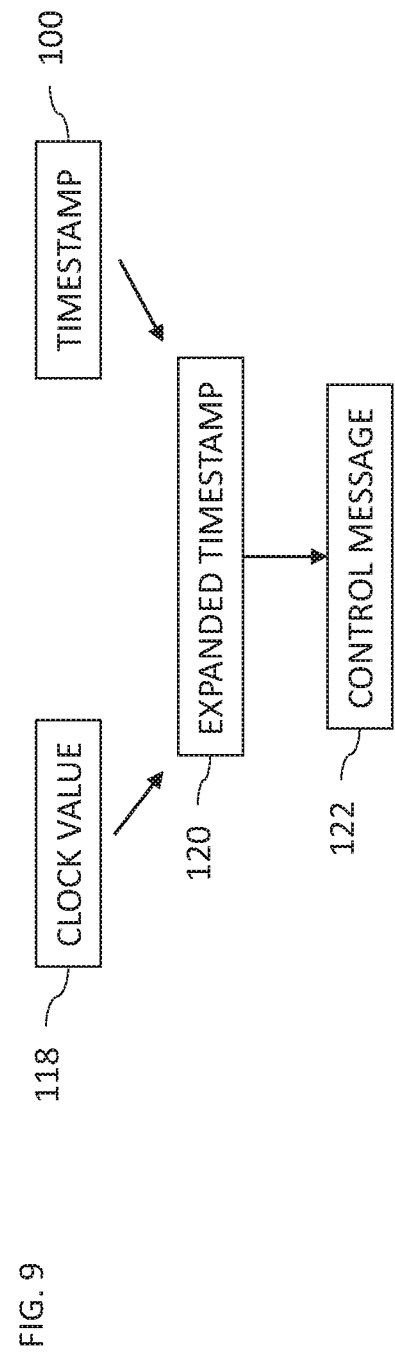
FIG. 9 is a block diagram illustrating the method of FIG. 8.

Reference is now made to FIGS. 8 and 9. FIG. 8 is a flowchart 106 including steps in a method to expand the computed timestamp 100 in the system 10 of FIG. 1. Reference is now made to FIG. 9 is a block diagram illustrating the method of FIG. 8.

The controller circuitry 30 is configured to receive (block 108) the data packet 90 (FIG. 7) with the computed timestamp 100 (e.g. of 26 bits). The controller circuitry 30 is configured to retrieve (block 110) a current clock value 118 from the hardware clock 26 (FIG. 1). The MSBs (e.g., 64 bits) of the current clock value 118 (including the MSBs of the time when the data packet 90 entered the receive PHY pipeline circuitry 40) are selected from the retrieved current clock value 118. The controller circuitry 30 is configured to compute (block 112) an expanded timestamp 120 (e.g., of 80 bits) responsively to the computed timestamp 100 and the MSBs of the current clock value 118 of the hardware clock 26. The controller circuitry 30 is configured to generate (block 114) a control message 122 including the expanded timestamp 120 and provide (block 116) the control message 122 to the host computer 14 (FIG. 1).

The above steps of blocks 108-116 may be performed at any suitable location in the controller circuitry 30.

Reference is now made to FIGS. 10 and 11. FIG. 10 is a block diagram of the hardware clock 26 in the system 10 of FIG. 1. FIG. 11 is a flowchart 130 including steps in a time synchronization method in the system 10 of FIG. 1.

The hardware clock 26 may include an oscillator 124, a phase locked loop 126, and a register 128. The oscillator 124 drives the phase locked loop 126 which provides an adjustment to the frequency provided by the oscillator 124. The frequency adjustment is provided by the phase locked loop 126 to the register 128 which maintains the current time according to any suitable standard, for example, UTC. The current time may then be provided from the register 128 to the receive PHY pipeline circuitry 40 and other elements of the network device 12 as needed.

Some of the packets processed by the network device 12 are PTP synchronization messages or other time synchronization messages received from the master clock device 34 (FIG. 1). The messages are processed by the PTP software 18 (FIG. 1) as described in more detail below.

The processor 16 (FIG. 1) of the host computer 14 is configured to run software instructions of the PTP software 18 to: receive (block 132) time synchronization message(s); compute (block 134) an adjustment 138 to the clock value (e.g., drift) of the hardware clock 26 responsively to the time synchronization message(s), and provide (block 136) the adjustment 138 to the phase locked loop 126 of the hardware clock 26. The phase locked loop 126 of the hardware clock 26 is configured to adjust the clock value stored in the register 128 responsively to the computed adjustment 138.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network device, comprising:
 a network interface port configured to receive data symbols from a network node over a packet data network, at least some of the symbols being comprised in data packets;
 a hardware clock configured to maintain a clock value; and
 controller circuitry comprising physical layer (PHY) circuitry, which includes:
  receive PHY pipeline circuitry configured to process arrival of the received data symbols; and
  a counter configured to maintain a counter value indicative of a number of the data symbols in the receive PHY pipeline circuitry, wherein the receive PHY pipeline circuitry is configured to: identify a start of frame delimiter of one of the data packets; and compute a timestamp of when the identified start of frame delimiter entered the receive PHY pipeline circuitry based on the clock value and the counter value, the controller circuitry being configured to assign the computed timestamp to the one of the data packets of the identified start of frame delimiter.

2. The device according to claim 1, wherein the one of the data packets of the identified start of frame delimiter includes a cyclic redundancy check (CRC) field populated with a first CRC code, wherein the controller circuitry is configured to:
check the first CRC code;
compute a second CRC code responsive to the one of the data packets, the second CRC code being shorter than the first CRC code; and
insert the second CRC code and the computed timestamp in the CRC field in place of the first CRC code.

3. The device according to claim 1, wherein the one of the data packets of the identified start of frame delimiter includes a time synchronization message received from a master clock in the packet data network.

4. The device according to claim 1, wherein the receive PHY pipeline circuitry is configured to:
process arrival of the received data symbols according to a given symbol timing; and
compute the timestamp of when the identified start of frame delimiter entered the receive PHY pipeline circuitry, responsive to the clock value reduced by an adjustment based on the counter value and the symbol timing.

5. The device according to claim 1, wherein the controller circuitry is configured to:
compute an expanded timestamp responsive to the computed timestamp and a current clock value of the hardware clock; and
generate a control message including the expanded timestamp.

6. The device according to claim 4, wherein the receive PHY pipeline circuitry is configured to compute the adjustment responsive to the counter value divided by a symbol frequency of the symbols.

7. The device according to claim 4, wherein the receive PHY pipeline circuitry is configured to compute the adjustment responsive to the counter value multiplied by a symbol period of the symbols.

8. The device according to claim 1, wherein the receive PHY pipeline circuitry is configured to process the symbols with a non-constant delay such that different respective ones of the symbols reside in the receive PHY pipeline circuitry for respective different lengths of time.

9. The device according to claim 1, wherein the counter is configured to: increment the counter value responsive to ones of the symbols entering the receive PHY pipeline circuitry; and decrement the counter value responsive to ones of the symbols exiting the receive PHY pipeline circuitry.

10. The device according to claim 9, wherein the receive PHY pipeline circuitry is configured to set the counter value responsive to: an event, which indicates a given number of the symbols in the receive PHY pipeline circuitry; and the given number of the symbols.

11. The device according to claim 10, wherein the event includes achieving block lock in the receive PHY pipeline circuitry.

12. The device according to claim 10, wherein: the event includes achieving lock of a forward error correction (FEC) block in the receive PHY pipeline circuitry; and the given number is a size of the FEC block.

13. The device according to claim 9, wherein the counter is configured to decrement the counter value responsive to ones of the symbols consumed in the receive PHY pipeline circuitry.

14. The device according to claim 13, wherein the receive PHY pipeline circuitry is configured to decrement the counter value responsive to when the consumed symbols would have reached the counter along the receive PHY pipeline circuitry if the consumed symbols were still in the receive PHY pipeline circuitry.

15. The device according to claim 14, wherein the receive PHY pipeline circuitry is configured to insert respective control signals in the receive PHY pipeline circuitry at respective positions in the receive PHY pipeline circuitry from where respective ones of the consumed symbols are removed from the receive PHY pipeline circuitry.

16. A computer system, comprising:
a network device, comprising: a network interface port configured to receive data symbols from a network node over a packet data network, at least some of the symbols being comprised in data packets; a hardware clock configured to maintain a clock value; and controller circuitry comprising physical layer (PHY) circuitry, which includes:
receive PHY pipeline circuitry configured to: process arrival of the received data symbols according to a given symbol timing; and identify a start of frame delimiter of one of the data packets; and
a counter to maintain a counter value indicative of a number of the data symbols in the receive PHY pipeline circuitry, wherein:
the receive PHY pipeline circuitry is configured to compute a timestamp of when the identified start of frame delimiter entered the receive PHY pipeline circuitry responsive to the clock value reduced by a first adjustment based on the counter value and the symbol timing; and
the controller circuitry is configured to assign the computed timestamp to the one of the data packets of the identified start of frame delimiter, the one of the data packets of the identified start of frame delimiter including a time synchronization message received from a master clock in the packet data network; and
a host device comprising a processor configured to run software instructions to: receive the time synchronization message and compute a second adjustment to the clock value of the hardware clock responsive to the time synchronization message, wherein the hardware clock is configured to adjust the clock value responsive to the computed second adjustment.

17. The system according to claim 16, wherein the counter is configured to: increment the counter value responsive to ones of the symbols entering the receive PHY pipeline circuitry; and decrement the counter value responsive to ones of the symbols exiting the receive PHY pipeline circuitry.

18. The system according to claim 17, wherein the receive PHY pipeline circuitry is configured to set the counter value responsive to: an event, which indicates a given number of the symbols in the receive PHY pipeline circuitry; and the given number of the symbols.

19. The system according to claim 17, wherein the counter is configured to decrement the counter value responsive to ones of the symbols consumed in the receive PHY pipeline circuitry.

20. The system according to claim 19, wherein the receive PHY pipeline circuitry is configured to decrement the counter value responsive to when the consumed symbols would have reached the counter along the receive PHY pipeline circuitry if the consumed symbols were still in the receive PHY pipeline circuitry.

21. A networking method, comprising:
receiving data symbols from a network node over a packet data network, at least some of the symbols being comprised in data packets;
maintaining a clock value;
processing arrival of the received data symbols according to a given symbol timing;
identifying a start of frame delimiter of one of the data packets;
maintaining a counter value indicative of a number of the data symbols in receive PHY pipeline circuitry;
computing a timestamp of when the identified start of frame delimiter entered the receive PHY pipeline circuitry responsive to the clock value reduced by an adjustment based on the counter value and the symbol timing; and
assigning the computed timestamp to the one of the data packets of the identified start of frame delimiter.

* * * * *